W. J. McPHERSON.
ANIMAL TRAP.
APPLICATION FILED NOV. 5, 1913.
1,110,636.
Patented Sept. 15, 1914.
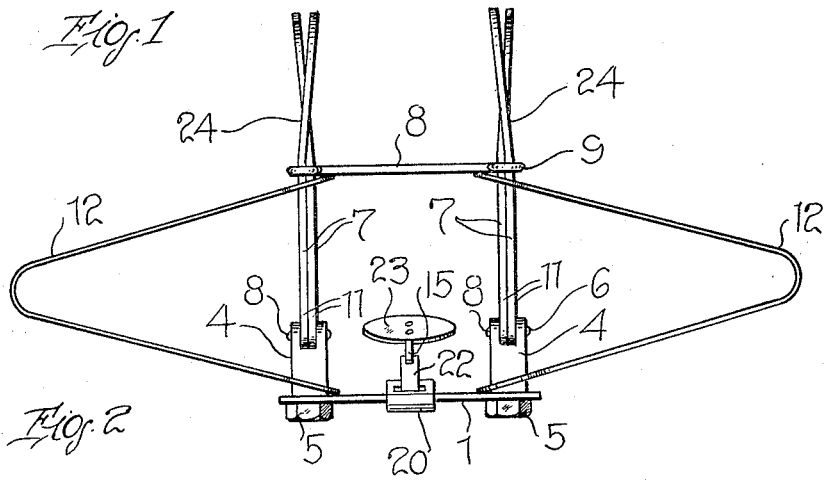
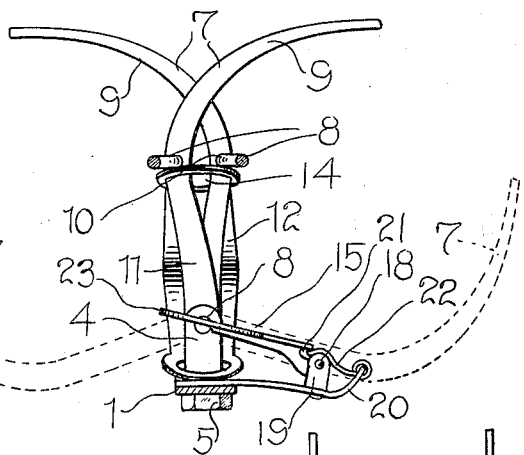
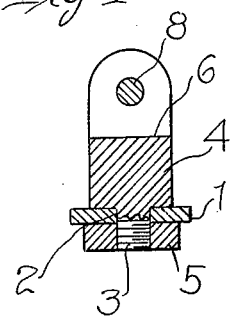
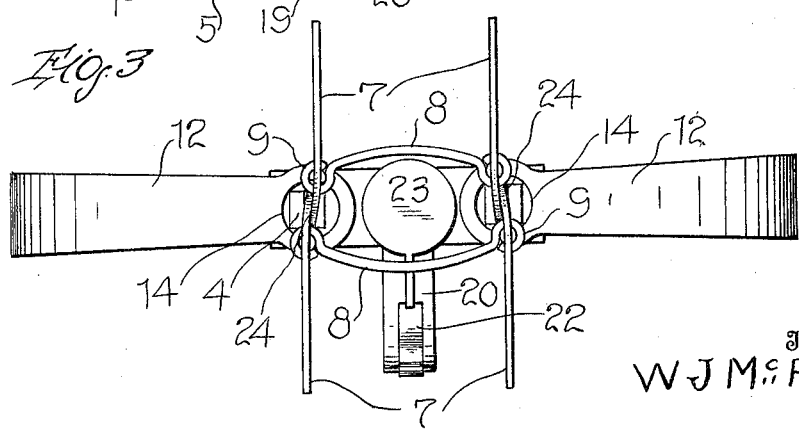
Inventor
W J Mc PHERSON
Witnesses
Robert M. Sutphen
A. J. Hind
By Watson E. Coleman
Attorney

UNITED STATES PATENT OFFICE.

WILLIAM J. McPHERSON, OF LAFONTAINE, KANSAS.

ANIMAL-TRAP.

1,110,636.  Specification of Letters Patent.  Patented Sept. 15, 1914.

Application filed November 5, 1913. Serial No. 799,368.

*To all whom it may concern:*

Be it known that I, WILLIAM J. McPHERSON, a citizen of the United States, residing at Lafontaine, in the county of Wilson and State of Kansas, have invented certain new and useful Improvements in Animal-Traps, of which the following is a specification, reference being had to the accompanying drawings.

This invention relates to certain improvements in animal traps and has relation more particularly to a device of this general character known as a jaw trap and the object of the invention is to provide a device of this general type having means of a novel and improved character whereby an animal may be effectively trapped without in no wise injuring the pelt.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in front elevation of a trap constructed in accordance with an embodiment of my invention; Fig. 2 is a vertical sectional view taken substantially centrally of Fig. 1, the trigger mechanism being shown in set relation to better illustrate the coaction of the parts; Fig. 3 is a view in top plan of the device as illustrated in Fig. 1; and Fig. 4 is a detail sectional view on an enlarged scale.

As disclosed in the accompanying drawings, 1 denotes a body member, herein shown as rectangular in form and preferably produced of strap metal and having produced adjacent its opposite ends perforations 2 through which are adapted to be passed the threaded extensions 3 of the posts 4, each of such extensions 3 being reduced relatively to the post proper and being suitably engaged by a clamping member 5, herein shown as a conventional bur or nut, whereby it will be readily perceived that such post may be conveniently and effectively clamped in operative position.

The free or upper extremity of each of the posts 4 is bifurcated and in the kerf 6 thereof is mounted the lower extremities of the jaws 7—7, such extremities being pivotally held against displacement by the pin 8 intersecting such kerf 6 and passing through suitable openings in such lower extremities. The jaws 7 may be of any ordinary configuration but I prefer that they be of the form disclosed in the accompanying drawings wherein such jaws are reversely related and each having its upper extremity disposed on an arcuate curve, as indicated at 9. It is to be particularly observed that the edges of the jaws together with the point or free extremity are blunt so that the pelt of an animal caught therebetween will not become pierced or otherwise mutilated as would tend to minimize the value thereof.

In the embodiment of my invention disclosed in the accompanying drawings, a device is illustrated which is especially designed to be employed for trapping marten, mink, coon and other animals of like nature, and it will be observed that the jaws or grapples 7 are of such configuration as to embrace the body of the animal when the trap is sprung, and I have found in practice that the force of impact is sufficient to instantly kill the animal. Similar jaws or grapples 7 of each of the posts 4 at a predetermined point but preferably substantially centrally of the height thereof are united or connected by a side bar 8 and, as herein disclosed, each of such side bars is substantially U-shaped in form with the extremities thereof formed into the hook members 9 passed through suitable apertures 10 produced in such jaws or grapples 7, the base portions 11 of such bars being outwardly disposed whereby no hindrance or obstruction will be offered to the jaws or grapples 7 when sprung and thereby assuring proper impact thereof with the body of the animal.

As disclosed in the present embodiment of my invention, the jaws or grapples 7 are sprung through the medium of the leaf springs 12 possessing the requisite tension to assure the proper blow or contact with the jaws or grapples 7 with the animal and, as herein set forth, each of the springs 12 is substantially V-shaped in form having produced in their extremities the openings 14 through which project, when the trap is set, the posts 4. When the trap is sprung, the uppermost opening in each of such springs results in the requisite operation of the jaws or grapples 7, as is believed to be obvious. A further detail of the springs is not believed to be necessary as the same are well known in devices of this general character. For maintaining the trap in set adjustment I employ, as herein disclosed, a trigger member 15 pivotally secured, as at 18, to the post 19 suitably secured to and projecting upwardly from the arm 20 projecting laterally of the body member 1 and of such a curvature as to serve to contact with the surface on which the device is rested to maintain the same in proper position. The trigger member is provided at a point above and in close proximity to its pivot with a notch 21 in which is adapted to project the end portion of a latch 22 of suitable configuration and beneath which is adapted to be positioned one of the side bars 8, the tension of the springs 12 serving to maintain the latch 22 in operative position. The free extremity of the trigger 15 is provided with a bait-pan or plate 23, the length of such trigger 15 being such as to permit the plate or pan 23 to be positioned directly above the body member 1, whereby it is assured that the animal endeavoring to obtain the bait thereon will be in such position as to be properly engaged by the jaws or grapples 7. I also wish to direct particular attention to the interlocking arrangement of the coacting jaws or grapples 7 whereby they are maintained substantially rigid thus effectively preventing lateral displacement or twisting which I have found by actual experience to be essential. As disclosed in the drawings, this interlocking of the coacting jaws or grapples is effected by so curving the same, as shown at 24, as to cause the upper portions thereof to intersect with their adjacent faces opposite to those at the point of pivot.

From the foregoing it is thought to be obvious that an animal trap constructed in accordance with my invention is of an extremely simple and comparatively inexpensive nature and is particularly well adapted for use by reason of its manner of engagement with the animal whereby the possibility of injury to the pelt thereof is reduced to a minimum and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to claim and secure by Letters Patent is:

A trap comprising a body member, relatively movable reversely disposed curved jaws pivotally engaged therewith adjacent the opposite extremities of the body, said jaws being laterally bent so that the opposed faces thereof at the points of intersection are opposite to the opposed faces at the points of pivot, substantially U-shaped side bars connected to the corresponding jaw at each extremity of the body, the bases of such side bars being outwardly disposed relative to the jaws with which they are connected and being offset relative thereto, means for imparting forcible movement to the jaws in one direction, and means coacting with one of the side bars for controlling the action of such operating means.

In testimony whereof I hereunto affix my signature in the presence of two witnesses.

WILLIAM J. McPHERSON.

Witnesses:
THOMAS R. YORK,
WILLIAM H. YORK.

---

Copies of this patent may be obtained for five cents each, by addressing the "Commissioner of Patents, Washington, D. C."